(12) United States Patent
Cendoya

(10) Patent No.: US 11,091,001 B2
(45) Date of Patent: Aug. 17, 2021

(54) BASE VALVE ASSEMBLY FOR DAMPER

(71) Applicant: DRiV Automotive Inc., Lake Forest, IL (US)

(72) Inventor: Alexander Alvarez Cendoya, Bilbao (ES)

(73) Assignee: DRiV Automotive Inc., Lake Forest, IL (US)

(*) Notice: Subject to any disclaimer, the term of this patent is extended or adjusted under 35 U.S.C. 154(b) by 0 days.

(21) Appl. No.: 16/578,666

(22) Filed: Sep. 23, 2019

(65) Prior Publication Data
US 2021/0086579 A1 Mar. 25, 2021

(51) Int. Cl.
F16F 5/00 (2006.01)
B60G 17/08 (2006.01)
F16F 9/44 (2006.01)
F16F 9/18 (2006.01)
B60G 13/06 (2006.01)

(52) U.S. Cl.
CPC ............ *B60G 17/08* (2013.01); *B60G 13/06* (2013.01); *F16F 9/187* (2013.01); *F16F 9/44* (2013.01); B60G 2202/24 (2013.01); B60G 2500/11 (2013.01)

(58) Field of Classification Search
CPC ...... F16F 9/064; F16F 9/19; F16F 9/49; F16F 9/187; F16F 9/325
USPC ............................... 188/315, 322.13, 322.14
See application file for complete search history.

(56) References Cited

U.S. PATENT DOCUMENTS

| 5,522,486 | A | * | 6/1996 | Fulks | ........................ | F16F 9/34 |
| | | | | | | 188/286 |
| 5,588,510 | A | * | 12/1996 | Wilke | .................... | F16F 9/064 |
| | | | | | | 188/266.6 |
| 6,340,081 | B1 | | 1/2002 | Keil | | |
| 8,083,039 | B2 | | 12/2011 | Vanbrabant | | |
| 8,511,447 | B2 | * | 8/2013 | Nowaczyk | .............. | F16F 9/325 |
| | | | | | | 188/315 |
| 8,733,520 | B2 | * | 5/2014 | Kim | ...................... | F16F 9/3485 |
| | | | | | | 188/322.14 |
| 8,973,726 | B2 | * | 3/2015 | Tsukahara | ................. | F16F 9/19 |
| | | | | | | 188/315 |
| 8,991,571 | B2 | * | 3/2015 | Murakami | ................ | F16F 9/49 |
| | | | | | | 188/289 |
| 2011/0139557 | A1 | * | 6/2011 | Mangelschots | ......... | F16F 9/464 |
| | | | | | | 188/322.13 |
| 2013/0341140 | A1 | * | 12/2013 | Nakajima | ............... | F16F 9/187 |
| | | | | | | 188/315 |

(Continued)

Primary Examiner — Christopher P Schwartz
(74) Attorney, Agent, or Firm — McGarry Bair PC

(57) ABSTRACT

A damper includes a pressure tube, a piston assembly, a piston rod, a reserve tube, and a reserve chamber. The damper also includes a base valve assembly having a valve body and a compression disc assembly. The compression disc assembly engages a first end face of the valve body to restrict flow through at least one compression passage. The base valve assembly also includes a rebound disc assembly. The rebound disc assembly engages a second end face of the valve body to restrict flow through at least one rebound passage. The rebound disc assembly includes at least one rebound bending disc that directly engages the second end face to close the at least one rebound passage. The rebound bending disc bends in response to pressure within the at least one rebound passage to permit flow through the at least one rebound passage.

13 Claims, 4 Drawing Sheets

(56) References Cited

U.S. PATENT DOCUMENTS

2016/0017950 A1\* 1/2016 Nakano .................. F16F 9/187
 188/315

\* cited by examiner

BASE VALVE ASSEMBLY FOR DAMPER

TECHNICAL FIELD

The present disclosure relates to a damper for a vehicle and, more particularly, to a base valve assembly for the damper.

BACKGROUND

A damper associated with a suspension system typically includes a pressure tube having a movable piston assembly therein and a reserve tube surrounding the pressure tube. During operation of the damper, the piston assembly slides within the pressure tube and displaces a working fluid within the pressure tube, and between the pressure tube and the reserve tube. Accordingly, a base valve assembly is provided between the pressure tube and the reserve tube in order to control fluid flow between the pressure tube and the reserve tube and tune compression and rebound characteristics of the damper as per user requirements.

However, in many situations, the base valve assembly may be tunable for a required compression characteristic of the damper whereas a rebound characteristic of the damper may be a constant ratio of the compression characteristic. As such, a rebound damping may always be dependent on a preselected compression damping, in turn, limiting independent tuning of the rebound characteristics relative to the compression characteristics of the damper. Also, the rebound damping may depend on a rod to bore ratio of the piston assembly and the pressure tube, in turn, limiting the rebound damping to be constant for a given size of the piston assembly and the pressure tube.

SUMMARY

In an aspect of the present disclosure, a damper is provided. The damper includes a pressure tube forming a working chamber. The damper includes a piston assembly disposed within the working chamber. The piston assembly divides the working chamber into an upper working chamber and a lower working chamber. The damper includes a piston rod attached to the piston assembly. The damper also includes a reserve tube disposed around the pressure tube. The reserve tube defines a reserve chamber between the pressure tube and the reserve tube. The damper further includes a base valve assembly fluidly disposed between the lower working chamber and the reserve chamber. The base valve assembly includes a valve body. The valve body defines at least one compression passage and at least one rebound passage. The base valve assembly also includes a compression disc assembly. The compression disc assembly engages a first end face of the valve body to restrict flow through the at least one compression passage. The base valve assembly further includes a rebound disc assembly. The rebound disc assembly engages a second end face of the valve body to restrict flow through the at least one rebound passage. The rebound disc assembly includes at least one rebound bending disc that directly engages the second end face to close the at least one rebound passage. The rebound bending disc bends in response to pressure within the at least one rebound passage to permit flow through the at least one rebound passage.

In another aspect of the present disclosure, a damper is provided. The damper includes a pressure tube forming a working chamber. The damper includes a piston assembly disposed within the working chamber. The piston assembly divides the working chamber into an upper working chamber and a lower working chamber. The damper includes a piston rod attached to the piston assembly. The damper includes a reserve tube disposed around the pressure tube. The reserve tube defines a reserve chamber between the pressure tube and the reserve tube. The damper includes an intermediate tube disposed between the pressure tube and the reserve tube. An intermediate chamber is defined between the intermediate tube and the pressure tube. The damper also includes an electronic valve fluidly coupled to the intermediate chamber and the reserve chamber. The electronic valve is adapted to control fluid flow between the intermediate chamber and the reserve chamber. The damper further includes a base valve assembly fluidly disposed between the lower working chamber and the reserve chamber. The base valve assembly includes a valve body. The valve body defines at least one compression passage and at least one rebound passage. The base valve assembly also includes a compression disc assembly. The compression disc assembly engages a first end face of the valve body to restrict flow through the at least one compression passage. The base valve assembly further includes a rebound disc assembly. The rebound disc assembly engages a second end face of the valve body to restrict flow through the at least one rebound passage. The rebound disc assembly includes at least one rebound bending disc that directly engages the second end face to close the at least one rebound passage. The rebound bending disc bends in response to pressure within the at least one rebound passage to permit flow through the at least one rebound passage.

In another aspect of the present disclosure, a damper is provided. The damper includes a pressure tube forming a working chamber. The damper includes a piston assembly disposed within the working chamber. The piston assembly divides the working chamber into an upper working chamber and a lower working chamber. The damper includes a piston rod attached to the piston assembly. The damper also includes a reserve tube disposed around the pressure tube. The reserve tube defines a reserve chamber between the pressure tube and the reserve tube. The damper further includes a base valve assembly fluidly disposed between the lower working chamber and the reserve chamber. The base valve assembly includes an elongate member having a first end and a second end opposite to the first end. The elongate member includes a head at the first end. The base valve assembly includes a nut threadably engaged with the elongate member proximate the second end. The base valve assembly includes a valve body disposed around the elongate member. The valve body defines at least one compression passage and at least one rebound passage. The base valve assembly also includes a compression disc assembly disposed around the elongate member. The compression disc assembly engages a first end face of the valve body to restrict flow through the at least one compression passage. The base valve assembly further includes a rebound disc assembly disposed around the elongate member. The rebound disc assembly engages a second end face of the valve body to restrict flow through the at least one rebound passage. The rebound disc assembly includes at least one rebound bending disc that directly engages the second end face to close the at least one rebound passage. The rebound bending disc bends in response to pressure within the at least one rebound passage to permit flow through the at least one rebound passage. The valve body, the compression disc assembly and the rebound disc assembly are clamped between the head and the nut.

Other features and aspects of this disclosure will be apparent from the following description and the accompanying drawings.

DETAILED DESCRIPTION

Figure 1:
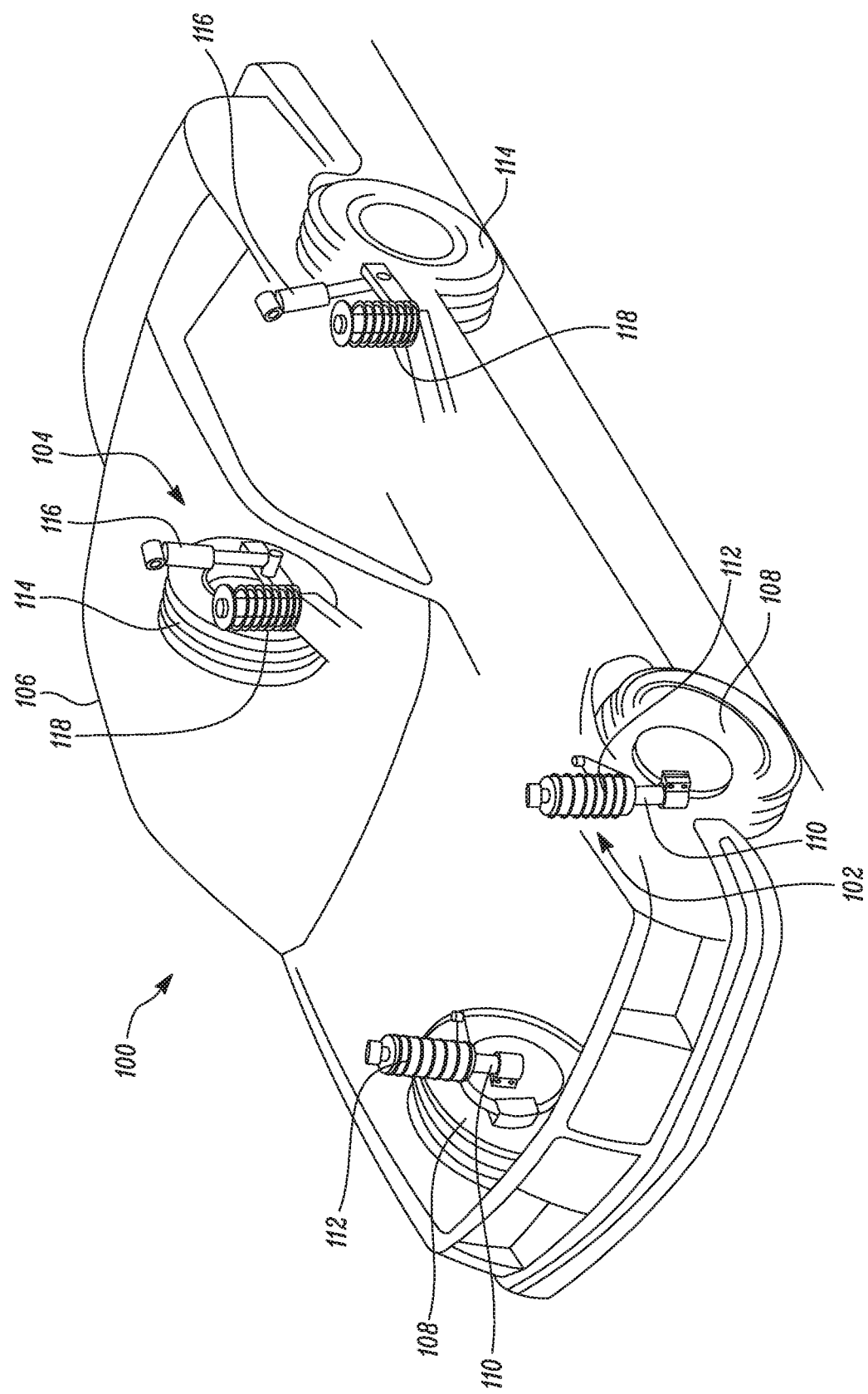
FIG. 1 is a perspective view of an exemplary vehicle incorporating a suspension system, according to an aspect of the present disclosure.

Wherever possible, the same reference numbers will be used throughout the drawings to refer to same or like parts. Referring to FIG. 1, a perspective view of an exemplary vehicle 100 is illustrated. In the illustrated embodiment, the vehicle 100 is a passenger car. In other embodiments, the vehicle 100 may be any other vehicle, such as a Sports Utility Vehicle (SUV), a Multi Utility Vehicle (MUV), a truck, a bus, and so on, based on application requirements, having a front suspension system and/or a rear suspension system. Also, the vehicle 100 may be associated with any industry including, but not limited to, transportation, agriculture, construction, mining, material handling, and so on, based on application requirements.

The vehicle 100 includes a front suspension system 102, a rear suspension system 104, and a body 106. The front suspension system 102 includes a transversely extending front axle assembly (not shown) adapted to operatively support a pair of front wheels 108 of the vehicle 100. The front axle assembly is operatively connected to the body 106 by means of a pair of dampers 110 and a pair of helical coil springs 112. The rear suspension system 104 includes a transversely extending rear axle assembly (not shown) adapted to operatively support a pair of rear wheels 114 of the vehicle 100. The rear axle assembly is operatively connected to the body 106 by means of a pair of dampers 116 and a pair of helical coil springs 118. The dampers 110, 116 are adapted to dampen relative motion of an unsprung mass, i.e., the front suspension system 102 and the rear suspension system 104, of the vehicle 100, and a sprung mass, i.e., the body 106 of the vehicle 100.

Figure 2A:
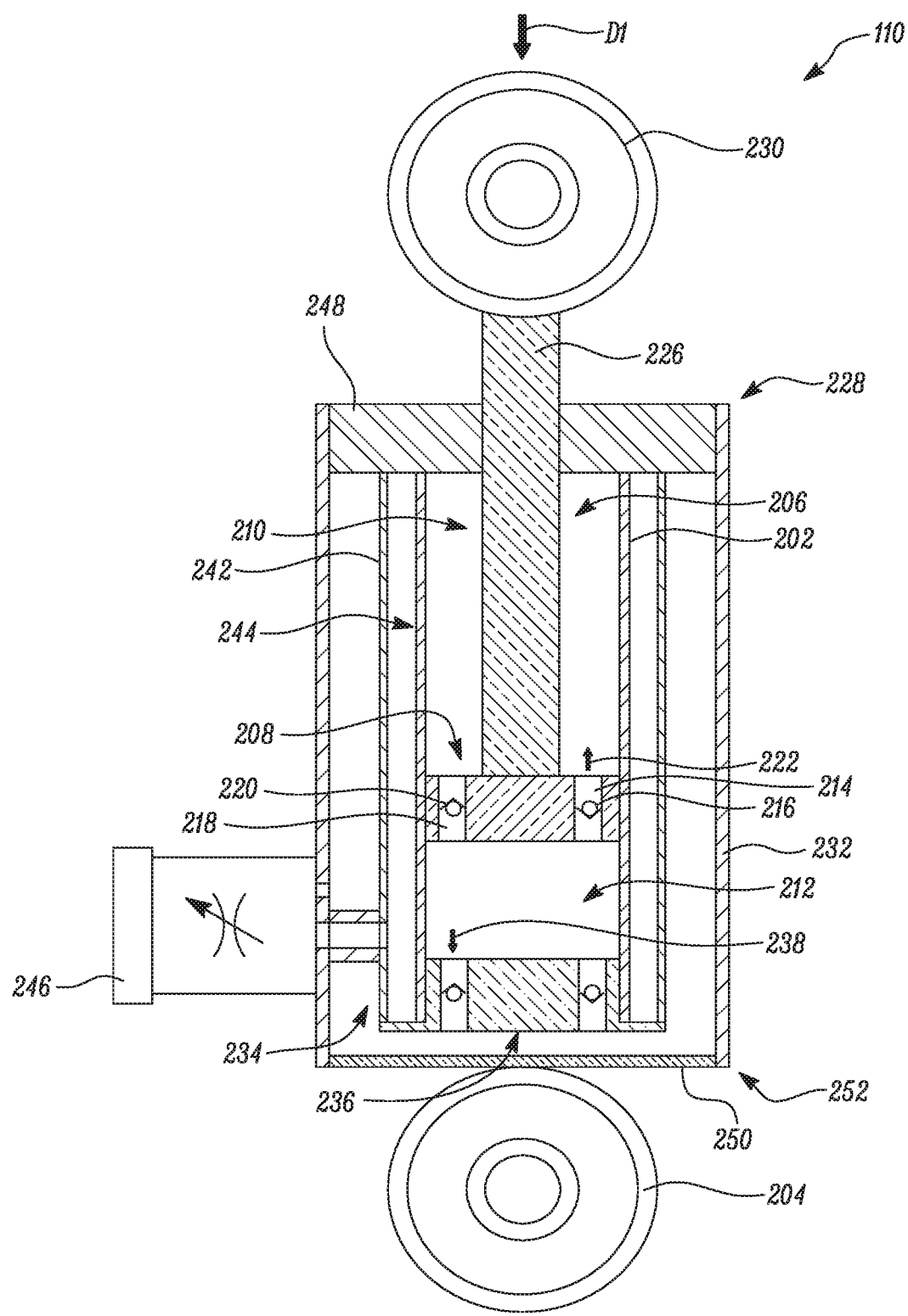
FIGS. 2A and 2B are different schematic representations of a damper of the suspension system, according to an aspect of the present disclosure.
Figure 2B:
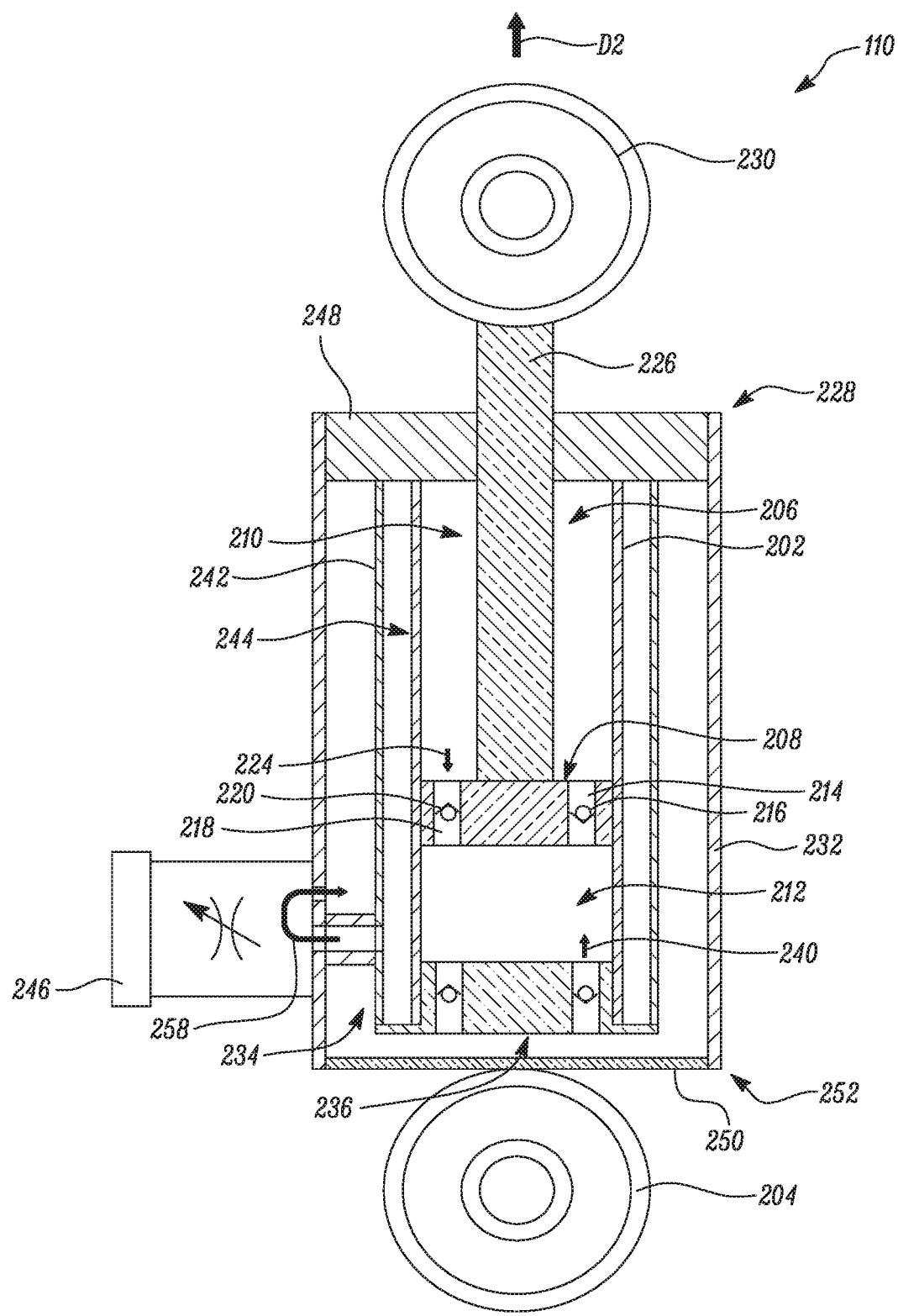

The dampers 110, 116 will now be explained with reference to the damper 110 associated with the front suspension system 102. It should be noted that the damper 116 associated with the rear suspension system 104 may have a configuration, structure, construction, and operation similar to that of the damper 110. Referring to FIGS. 2A and 2B, a schematic representation of the damper 110 is illustrated. The damper 110 includes a pressure tube 202. The pressure tube 202 is adapted to be operatively coupled to the unsprung mass of the vehicle 100, such as the front suspension system 102, via a connector 204. The pressure tube 202 has a substantially hollow and elongate configuration defining a working chamber 206 therein. The pressure tube 202 is adapted to receive a fluid in the working chamber 206. The fluid may be any working fluid, such as hydraulic oil.

The damper 110 also includes a piston assembly 208. The piston assembly 208 is disposed slidably in the working chamber 206 of the pressure tube 202. Accordingly, the piston assembly 208 divides the working chamber 206 in an upper working chamber 210 and a lower working chamber 212. The upper working chamber 210 and the lower working chamber 212 are disposed on opposite sides of the piston assembly 208. The piston assembly 208 is adapted to slide within the working chamber 206 in a direction "D1" during a compression stroke of the damper 110, and in a direction "D2" during a rebound stroke of the damper 110.

The piston assembly 208 includes at least one piston compression passage 214. The piston compression passage 214 is fluidly coupled to each of the upper working chamber 210 and the lower working chamber 212. Additionally, the piston assembly 208 includes a piston compression valve 216 disposed in the piston compression passage 214. The piston compression valve 216 is adapted to selectively allow flow of fluid from the lower working chamber 212 to the upper working chamber 210 through the piston compression passage 214 during the compression stroke of the damper 110, as shown by an arrow 222. The piston compression valve 216 may be any valve assembly, such as a check valve assembly, a diaphragm valve assembly, a disc valve assembly, and so on, based on application requirements.

The piston assembly 208 also includes at least one piston rebound passage 218. The piston rebound passage 218 is fluidly coupled to each of the upper working chamber 210 and the lower working chamber 212. Additionally, the piston assembly 208 includes a piston rebound valve 220 disposed in the piston rebound passage 218. The piston rebound valve 220 is adapted to selectively allow flow of fluid from the upper working chamber 210 to the lower working chamber 212 through the piston rebound passage 218 during the rebound stroke of the damper 110, as shown by an arrow 224. The piston rebound valve 220 may be any valve assembly, such as a check valve assembly, a diaphragm valve assembly, a disc valve assembly, and so on, based on application requirements. It should be noted that the piston assembly 208 may include additional components not described herein, such as one or more sealing elements, spring elements, conduits, couplers, fasteners, and so on, based on application requirements.

The damper 110 also includes a piston rod 226 attached to the piston assembly 208. The piston rod 226 extends through the upper working chamber 210 of the pressure tube 202 and out of an upper end 228 of the damper 110. The piston rod 226 is adapted to be operatively coupled to the sprung mass of the vehicle 100, such as the body 106, via a connector 230. The damper 110 also includes a reserve tube 232. The reserve tube 232 is disposed around the pressure tube 202 and defines a reserve chamber 234 between the pressure tube 202 and the reserve tube 232. The reserve chamber 234 is fluidly coupled to the lower working chamber 212 of the pressure tube 202 via a base valve assembly 236. Accordingly, the base valve assembly 236 allows flow of fluid from the lower working chamber 212 to the reserve chamber 234 during the compression stroke of the damper 110, as shown by an arrow 238. Also, the base valve assembly 236 allows flow of fluid from the reserve chamber 234 into the lower working chamber 212 during the rebound stroke of the damper 110, as shown by an arrow 240. The base valve assembly 236 will be explained in more detail later.

The damper 110 also includes an intermediate tube 242. The intermediate tube 242 is disposed between the pressure tube 202 and the reserve tube 232. Accordingly, the intermediate tube 242 defines an intermediate chamber 244 disposed between the intermediate tube 242 and the pressure tube 202. The damper 110 also includes an electronic valve 246 fluidly coupled to the intermediate chamber 244 and the reserve chamber 234. The electronic valve 246 is adapted to control flow of fluid between the intermediate chamber 244 and the reserve chamber 234. More specifically, the electronic valve 246 is adapted to selectively allow flow of fluid from the intermediate chamber 244 to the reserve chamber 234 therethrough during the rebound stroke of the damper 110, as shown by an arrow 258. The electronic valve 246 may be any electronically operated fluid control valve, such as a solenoid valve. In some embodiments, the electronic valve 246 is a variable flow control valve.

Additionally, the damper 110 also includes an upper cap 248 disposed at the upper end 228 of the damper 110. The upper cap 248 is adapted to seal each of the pressure tube 202, the upper working chamber 210, the reserve tube 232, the reserve chamber 234, and the intermediate chamber 244 at the upper end 228. The upper cap 248 is also adapted to slidably receive the piston rod 226 therethrough. The damper 110 also includes a lower cap 250 disposed at a lower end 252 of the damper 110. The lower cap 250 is adapted to seal each of the reserve tube 232 and the reserve chamber 234 at the lower end 252.

The base valve assembly 236 is also adapted to seal the intermediate chamber 244 at the lower end 252. More specifically, a portion of the base valve assembly 236 extends laterally in order to couple with each of the pressure tube 202 and the intermediate tube 242 and, thus, seal the intermediate chamber 244 at the lower end 252. It should be noted that the configuration of the damper 110, as shown in FIGS. 2A and 2B, is exemplary in nature and alternative configurations may be possible within the scope of the present disclosure.

The damper 110 also includes the base valve assembly 236. The base valve assembly 236 will be hereinafter interchangeably referred to as the "assembly 236". The assembly 236 is disposed within the pressure tube 202 and adjacent to the lower end 252 of the damper 110. The assembly 236 is fluidly disposed between the lower working chamber 212 and the reserve chamber 234. Accordingly, the assembly 236 is adapted to selectively allow flow of fluid from the lower working chamber 212 to the reserve chamber 234 during the compression stroke of the damper 110, as shown by the arrow 238. Also, the assembly 236 is adapted to selectively allow flow of fluid from the reserve chamber 234 to the lower working chamber 212 during the rebound stroke of the damper 110, as shown by the arrow 240.

It should be noted that the damper 110, as shown in FIGS. 2A and 2B, is exemplary in nature, and the damper 110 may have alternative configurations within the scope of the present disclosure. For example, the damper 110 may include a hydraulic compression stop assembly (not shown). Further, the damper 110 may include a rod guide assembly (not shown) disposed near the upper end 228 of the damper 110. As such, the damper 110 may have any configuration and may include additional components not described herein, based on application requirements.

Figure 3:
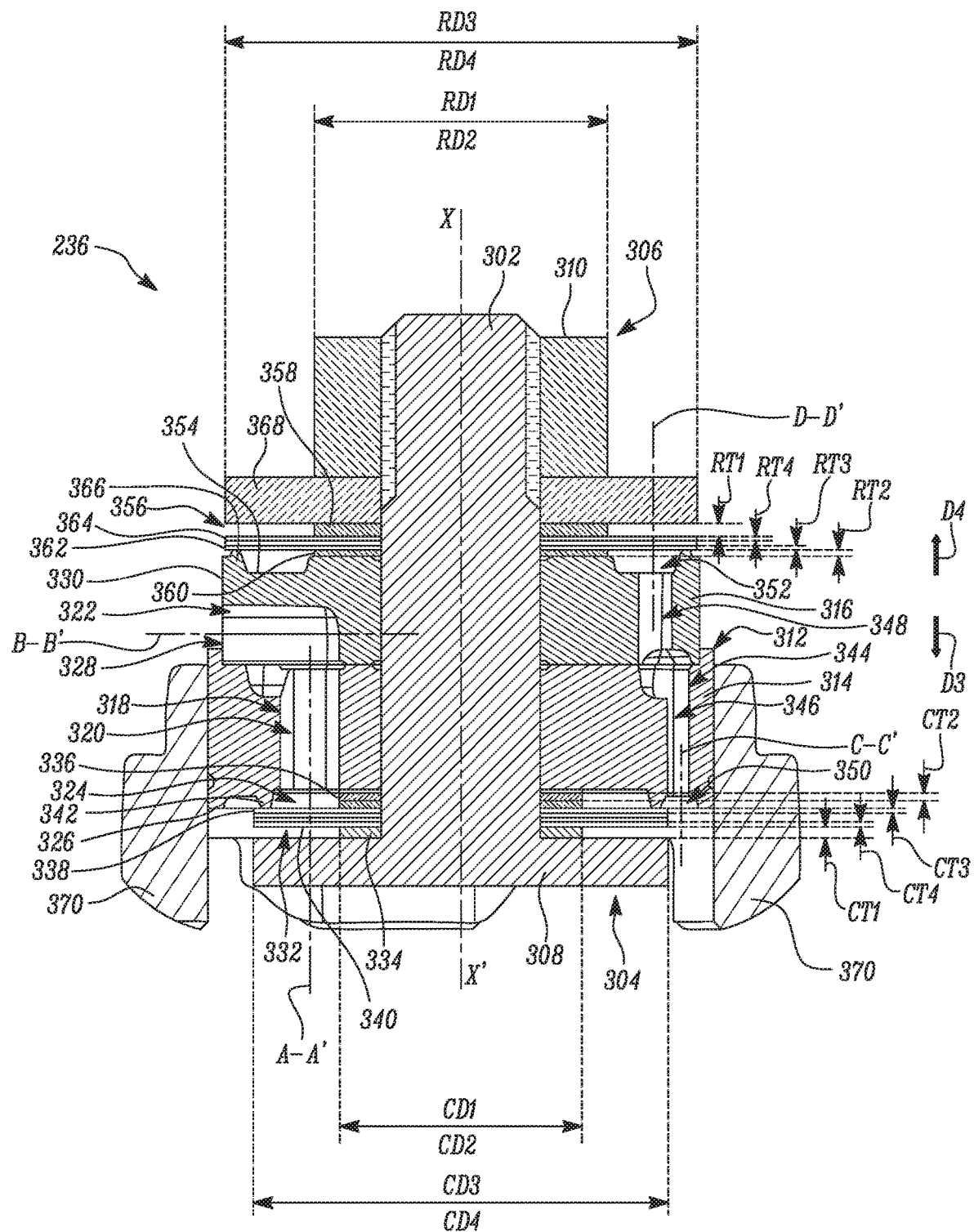
FIG. 3 is a cross-sectional view of a base valve assembly of the damper, according to an aspect of the present disclosure.

Referring to FIG. 3, a cross-sectional view of the assembly 236 is illustrated. The assembly 236 includes an elongate member 302 defining a longitudinal axis X-X' of the assembly 236. The elongate member 302 includes a first end 304 and a second end 306. The second end 306 is disposed opposite to the first end 304 along the longitudinal axis X-X'. In the illustrated embodiment, the elongate member 302 is a machine bolt. Accordingly, the elongate member 302 includes a head 308 disposed on the first end 304, and a nut 310 threadably engaged with the elongate member 302 proximate the second end 306. In other embodiments, the elongate member 302 may be any other fastener, such as a stud bolt. In such a situation, the elongate member 302 may include a nut (not shown) disposed threadably proximate the first end 304 of the elongate member 302, and the nut 310 disposed threadably proximate the second end 306.

The assembly 236 also includes a valve body 312. The valve body 312 will be hereinafter interchangeably referred to as the "body 312". The body 312 is disposed around the elongate member 302 and attached to the pressure tube 202. More specifically, in the illustrated embodiment, the body 312 includes a lower valve body 314 and an upper valve body 316. The lower valve body 314 is disposed proximate the first end 304 of the elongate member 302. The upper valve body 316 is disposed adjacent to the lower valve body 314 and proximate the second end 306 of the elongate member 302. Accordingly, the upper valve body 316 is disposed in the lower working chamber 212 of the pressure tube 202 (shown in FIGS. 2A and 2B). The lower and upper valve bodies 314, 316 includes axially aligned bores (not shown) to receive the elongate member 302 therethrough.

The assembly 236 also includes at least one compression passage 318. The compression passage 318 is defined by and extends through each of the lower valve body 314 and the upper valve body 316. More specifically, the compression passage 318 includes a first section 320 and a second section 322. The first section 320 is defined by the lower valve body 314, while the second section 322 is defined by the upper valve body 316. The first section 320 is disposed in the lower valve body 314 and defines a compression passage outlet 324 on a first end face 326 of the lower valve body 314. The compression passage outlet 324 will be hereinafter interchangeably referred to as the "compression outlet 324". In the illustrated embodiment, an outlet axis A-A' defined by the compression outlet 324 is substantially parallel to the longitudinal axis X-X'. In other embodiments, the outlet axis A-A' may be inclined at any other angle relative to the longitudinal axis X-X'.

The second section 322 is disposed in the upper valve body 316 of the body 312 and defines a compression passage inlet 328 on a side surface 330 of the upper valve body 316. The compression passage inlet 328 will be hereinafter interchangeably referred to as the "compression inlet 328". In the illustrated embodiment, an inlet axis B-B' defined by the compression inlet 328 is substantially perpendicular to the longitudinal axis X-X' and the outlet axis A-A'. Accordingly, the compression inlet 328 is orientated at approximately 90 degrees to the compression outlet 324. The compression passage 318 may therefore be substantially L-shaped and may change a flow direction of the fluid. In other embodiments, the inlet axis B-B' may be inclined at any other angle relative to the longitudinal axis X-X' and the outlet axis A-A'.

The compression inlet 328 is fluidly coupled to the lower working chamber 212 of the pressure tube 202. Accordingly, the compression inlet 328 is adapted to receive flow of fluid from the lower working chamber 212 into the second section 322 and the first section 320 of the compression passage 318. The compression outlet 324 is fluidly coupled to the reserve chamber 234 of the damper 110 (shown in FIGS. 2A and 2B). Accordingly, the compression outlet 324 is adapted to allow flow of fluid from the first section 320 to the reserve chamber 234. It should be noted that in the accompanying figure although only one compression passage 318 is illustrated, the body 312 may include multiple compression passages. In such a situation, each of the multiple compression passages may be disposed angularly spaced from each other and radially around the elongate member 302. Accordingly, the first end face 326 of the lower valve body 314 may include multiple compression outlets, such that each of the multiple compression outlets may be disposed angularly spaced from each other and radially around the elongate member 302. Also, the side surface 330 of the upper valve body 316 may include multiple compression inlets, such that each of the multiple compression inlets may be disposed angularly spaced from each other and radially around the elongate member 302.

The assembly 236 also includes a compression disc assembly 332. The compression disc assembly 332 is adapted to engage with the first end face 326 of the body 312 to restrict flow through the compression passage 318 and will be explained in more detail later. The compression disc assembly 332 is disposed around the elongate member 302 and between the lower valve body 314 and the first end 304 of the elongate member 302. The compression disc assembly 332 includes at least one compression fulcrum disc 334 disposed between the lower valve body 314 and the first end 304 of the elongate member 302. More specifically, the compression fulcrum disc 334 is disposed adjacent to the first end 304 of the elongate member 302. In the illustrated embodiment, the compression disc assembly 332 includes a single compression fulcrum disc 334. In other embodiments, the compression disc assembly 332 may include multiple compression fulcrum discs. In such a situation, each of the multiple compression fulcrum discs may be disposed adjacent to one another in a stacked configuration. The compression fulcrum disc 334 defines a diameter "CD1" and a thickness "CT1" thereof.

The compression disc assembly 332 also includes at least one compression preload disc 336 disposed between the lower valve body 314 and the first end 304 of the elongate member 302. More specifically, the compression preload discs 336 are disposed adjacent to the lower valve body 314. In the illustrated embodiment, the compression disc assembly 332 includes two compression preload discs 336 disposed adjacent to one another in a stacked configuration. In other embodiments, the compression disc assembly 332 may include single or multiple compression preload discs. Each of the compression preload discs 336 defines a diameter "CD2" and a thickness "CT2" thereof. In the illustrated embodiment, the diameter "CD2" is approximately equal to the diameter "CD1" of the compression fulcrum disc 334. In other embodiments, the diameter "CD2" may be greater or smaller than the diameter "CD1". Also, in the illustrated embodiment, the thickness "CT2" is smaller than the thickness "CT1" of the compression fulcrum disc 334. In other embodiments, the thickness "CT2" may be equal to or greater than the thickness "CT1".

The compression disc assembly 332 also includes a compression bending disc 338. The compression bending disc 338 is disposed between the compression fulcrum disc 334 and the compression preload disc 336. The compression bending disc 338 extends laterally relative to the longitudinal axis X-X' in order to extend over the compression outlet 324 disposed on the lower valve body 314. The compression bending disc 338 directly engages with the lower valve body 314 to close the compression outlet 324 of the compression passage 318. The compression bending disc 338 is adapted to bend in a direction "D3" in order to open the compression passage 318 and will be explained in more detail later. The compression bending disc 338 defines a diameter "CD3" and a thickness "CT3" thereof. The diameter "CD3" is greater than the diameter "CD1" of the compression fulcrum disc 334 and the diameter "CD2" of the compression preload disc 336. Also, the thickness "CT3" is smaller than the thickness "CT1" of the compression fulcrum disc 334 and the thickness "CT2" of the compression preload disc 336.

The compression disc assembly 332 further includes one or more additional bending discs 340. The additional bending discs 340 are disposed between the compression bending disc 338 and the compression fulcrum disc 334. In the illustrated embodiment, the compression disc assembly 332 includes three additional bending discs 340. In other embodiments, the compression disc assembly 332 may include single or multiple additional bending discs, based on application requirements. In yet some embodiments, the additional bending disc 340 may be omitted, such that the compression bending disc 338 may be disposed between and adjacent to each of the compression fulcrum disc 334 and the compression preload disc 336. Each of the additional bending discs 340 defines a diameter "CD4" and a thickness "CT4".

In the illustrated embodiment, the diameter "CD4" of each of the additional bending discs 340 is equal to one another. Further, each of the additional bending discs 340 may be identical to the compression bending disc 338. In other embodiments, the diameter "CD4" of one or more of the additional bending discs 340 may be different from one another. Also, in the illustrated embodiment, the diameter "CD4" is approximately equal to the diameter "CD3" of the compression bending disc 338. In other embodiments, the diameter "CD4" may be greater or smaller than the diameter "CD3". In the illustrated embodiment, the thickness "CT4" of each of the additional bending discs 340 is equal to one another. In other embodiments, the thickness "CT4" of one or more of the additional bending discs 340 may be different from one another. Also, in the illustrated embodiment, the thickness "CT4" is approximately equal to the thickness "CT3" of the compression bending disc 338. In other embodiments, the thickness "CT4" may be greater or smaller than the thickness "CT3".

The assembly 236 also includes a compression land 342 disposed on the lower valve body 314. More specifically, the compression land 342 is disposed on the first end face 326 of the lower valve body 314. The compression land 342 extends away from the first end face 326 substantially parallel to the longitudinal axis X-X'. Also, the compression land 342 is disposed on the first end face 326 adjacent to the compression outlet 324. Further, the compression land 342 is disposed radially around the elongate member 302 on the first end face 326 of the lower valve body 314. The compression bending disc 338 is adapted to directly engage with the compression land 342 in order to close the compression outlet 324 of the compression passage 318.

The assembly 236 also includes at least one rebound passage 344. The rebound passage 344 is spaced from the at least one compression passage 318. The rebound passage 344 is defined by and extends through each of the lower valve body 314 and the upper valve body 316 of the body 312. More specifically, the rebound passage 344 includes a first section 346 and a second section 348. The first section 346 is disposed in the lower valve body 314 and defines a rebound passage inlet 350 on the first end face 326 of the lower valve body 314. The rebound passage inlet 350 will be hereinafter interchangeably referred to as the "rebound inlet 350".

In the illustrated embodiment, an inlet axis C-C' defined by the rebound inlet 350 is substantially parallel to the longitudinal axis X-X'. In other embodiments, the inlet axis C-C' may be inclined at any other angle relative to the longitudinal axis X-X'. The second section 348 is disposed in the upper valve body 316 and defines a rebound passage outlet 352 on a second end face 354 of the upper valve body 316. The rebound passage outlet 352 will be hereinafter interchangeably referred to as the "rebound outlet 352". In the illustrated embodiment, an outlet axis D-D' defined by the rebound outlet 352 is substantially parallel to the longitudinal axis X-X' and the inlet axis C-C'. Accordingly, the rebound inlet 350 is orientated at approximately 180 degrees to the rebound outlet 352. In other embodiments, the outlet axis D-D' may be inclined at any other angle relative to the longitudinal axis X-X' and the inlet axis C-C'. Also, in the illustrated embodiment, the outlet axis D-D' is offset relative to the inlet axis C-C'. In other embodiments, the outlet axis D-D' may be linearly aligned with the inlet axis C-C'.

The rebound inlet 350 is fluidly coupled to the reserve chamber 234 of the damper 110. Accordingly, the rebound inlet 350 is adapted to receive flow of fluid from the reserve chamber 234 into the first section 346 and the second section 348 of the rebound passage 344. The rebound outlet 352 is fluidly coupled to the lower working chamber 212 of the pressure tube 202. Accordingly, the rebound outlet 352 is adapted to allow flow of fluid from the second section 348 to the lower working chamber 212. It should be noted that in the accompanying figure although only one rebound passage 344 is illustrated, the body 312 may include multiple rebound passages. In such a situation, each of the multiple rebound passages may be disposed angularly spaced from each other and radially around the elongate member 302. Accordingly, the first end face 326 of the lower valve body 314 may include multiple rebound inlets, such that each of the multiple rebound inlets may be disposed angularly spaced from each other and radially around the elongate member 302. Also, the second end face 354 of the upper valve body 316 may include multiple rebound outlets, such that each of the multiple rebound outlets may be disposed angularly spaced from each other and radially around the elongate member 302.

Additionally, the assembly 236 also includes a number of legs 370 (only two legs shown in FIG. 3). The legs 370 are disposed on the side surface 330 of the lower valve body 314 and extend parallel to the longitudinal axis X-X'. The legs 370 are disposed circumferentially spaced apart on the side surface 330 of the lower valve body 314. As such, a number of notches (not shown) are formed between each of the legs 370. The notches are fluidly coupled to the compression outlet 324 and the rebound inlet 350. Accordingly, the notches provide fluid communication between the compression passage 318 and the reserve chamber 234 via the compression outlet 324, and the rebound passage 344 and the reserve chamber 234 via the rebound inlet 350. The legs 370 are adapted to be coupled to each of the pressure tube 202 and the intermediate tube 242 adjacent to the lower end 252.

The assembly 236 also includes a rebound disc assembly 356. The rebound disc assembly 356 is adapted to engage the second end face 354 of the body 312 to restrict flow through the rebound passage 344 and will be explained in more detail later. The rebound disc assembly 356 is disposed around the elongate member 302 and between the upper valve body 316 and the second end 306 of the elongate member 302. The rebound disc assembly 356 includes at least one rebound fulcrum disc 358 disposed between the upper valve body 316 and the second end 306 of the elongate member 302. More specifically, the rebound fulcrum disc 358 is disposed adjacent to the second end 306 of the elongate member 302. In the illustrated embodiment, the rebound disc assembly 356 includes a single rebound fulcrum disc 358. In other embodiments, the rebound disc assembly 356 may include multiple rebound fulcrum discs. In such a situation, each of the multiple rebound fulcrum discs may be disposed adjacent to one another in a stacked configuration. The rebound fulcrum disc 358 defines a diameter "RD1" and a thickness "RT1" thereof.

The rebound disc assembly 356 also includes at least one rebound preload disc 360 disposed between the upper valve body 316 and the second end 306 of the elongate member 302. More specifically, the rebound preload disc 360 is disposed adjacent to the upper valve body 316. In the illustrated embodiment, the rebound disc assembly 356 includes a single rebound preload disc 360. In other embodiments, the rebound disc assembly 356 may include multiple rebound preload discs. In such a situation, each of the multiple rebound preload discs may be disposed adjacent to one another in a stacked configuration. The rebound preload disc 360 defines a diameter "RD2" and thickness "RT2" thereof. In the illustrated embodiment, the diameter "RD2" is approximately equal to the diameter "RD1" of the rebound fulcrum disc 358. In other embodiments, the diameter "RD2" may be greater or smaller than the diameter "RD1". Also, in the illustrated embodiment, the thickness "RT2" is smaller than the thickness "RT1" of the rebound fulcrum disc 358. In other embodiments, the thickness "RT2" may be equal to or greater than the thickness "RT1".

The rebound disc assembly 356 also includes a rebound bending disc 362. The rebound bending disc 362 directly engages the second end face 354 to close the rebound passage 344 and will be explained in more detail later. The rebound bending disc 362 is disposed between the rebound fulcrum disc 358 and the rebound preload disc 360. The rebound bending disc 362 extends laterally relative to the longitudinal axis X-X' in order to extend over the rebound outlet 352 disposed on the upper valve body 316. The rebound bending disc 362 directly engages with the upper valve body 316 to close the rebound outlet 352 of the rebound passage 344. The rebound bending disc 362 is adapted to bend in a direction "D4" in response to pressure within the rebound passage 344 to permit flow through the rebound passage 344 and will be explained in more detail later. The rebound bending disc 362 defines a diameter "RD3" and a thickness "RT3" thereof. The diameter "RD3" is greater than the diameter "RD1" of the rebound fulcrum disc 358 and the diameter "RD2" of the rebound preload disc 360. Also, the thickness "RT3" is smaller than the thickness "RT1" of the rebound fulcrum disc 358 and the thickness "RT2" of the rebound preload disc 360.

The rebound disc assembly 356 further includes one or more additional bending discs 364. The additional bending discs 364 are disposed between the rebound bending disc 362 and the rebound fulcrum disc 358. In the illustrated embodiment, the rebound disc assembly 356 includes two additional bending discs 364. In other embodiments, the rebound disc assembly 356 may include single or multiple additional bending discs, based on application requirements. In yet some embodiments, the additional bending disc 364 may be omitted, such that the rebound bending disc 362 may be disposed between and adjacent to each of the rebound fulcrum disc 358 and the rebound preload disc 360. Each of the additional bending discs 364 defines a diameter "RD4" and a thickness "RT4".

In the illustrated embodiment, the diameter "RD4" of each of the additional bending discs 364 is equal to one another. Further, each of the additional bending discs 364 may be identical to the rebound bending disc 362. In other embodiments, the diameter "RD4" of one or more of the additional bending discs 364 may be different from one another. Also, in the illustrated embodiment, the diameter "RD4" is approximately equal to the diameter "RD3" of the rebound bending disc 362. In other embodiments, the diameter "RD4" may be greater or smaller than the diameter "RD3". In the illustrated embodiment, the thickness "RT4" of each of the additional bending discs 364 is equal to one another. In other embodiments, the thickness "RT4" of one or more of the additional bending discs 364 may be different from one another. Also, in the illustrated embodiment, the thickness "RT4" is approximately equal to the thickness "RT3" of the rebound bending disc 362. In other embodiments, the thickness "RT4" may be greater or smaller than the thickness "RT3".

The assembly 236 also includes a rebound land 366 disposed on the upper valve body 316. More specifically, the rebound land 366 is disposed on the second end face 354 of the upper valve body 316. The rebound land 366 extends away from the second end face 354 substantially parallel to the longitudinal axis X-X'. Also, the rebound land 366 is disposed on the second end face 354 adjacent to the rebound outlet 352. Further, the rebound land 366 is disposed radially around the elongate member 302 on the second end face 354 of the upper valve body 316. The rebound bending disc 362 is adapted to directly engage with the rebound land 366 in order to close the rebound outlet 352 of the rebound passage 344.

The assembly 236 also includes a washer element 368. The washer element 368 is disposed around the elongate member 302 and between the nut 310 and the rebound disc assembly 356. More specifically, the washer element 368 is disposed adjacent to each of the nut 310 and the rebound fulcrum disc 358. The washer element 368 may be any washer or spacer, such as a rubber washer, a metallic washer, and so on, based on application requirements. In an embodiment, each of the body 312, the compression disc assembly 332, and the rebound disc assembly 356 is press-fitted to the elongate member 302. Further, each of the body 312, the compression disc assembly 332, and the rebound disc assembly 356 is clamped between the head 308 and the nut 310 of the elongate member 302.

A combination of the washer element 368, the press-fitting and the clamping provides a secure and stiff coupling of elements of the assembly 236 around the elongate member 302 and between the first end 304 and the second end 306 of the elongate member 302. For example, the lower valve body 314, the upper valve body 316, the compression fulcrum disc 334, the compression preload disc 336, the compression bending disc 338, the additional bending discs 340, the rebound fulcrum disc 358, the rebound preload disc 360, the rebound bending disc 362, and the additional bending discs 364 are clamped together around the elongate member 302 and between the first end 304 and the second end 306 of the elongate member 302.

In an assembled position of the assembly 236, as shown in the accompanying figure, the compression bending disc 338 engages and rests against the compression land 342. Accordingly, the compression outlet 324 is closed by the compression bending disc 338. During the compression stroke of the damper 110, as the piston assembly 208 travels in the direction "D1", the fluid flows from the lower working chamber 212 into the compression passage 318 through the compression inlet 328. Due to the compression stroke, a pressure of fluid within the compression passage 318 may increase above a threshold bending load of the compression bending disc 338. As such, the compression bending disc 338 and/or the additional bending discs 340 may bend in the direction "D3". Accordingly, the compression outlet 324 may open in order to allow flow of fluid from the compression passage 318 into the reserve chamber 234.

Also, in the assembled position of the assembly 236, as shown in the accompanying figure, the rebound bending disc 362 engages and rests against the rebound land 366. Accordingly, the rebound outlet 352 is closed by the rebound bending disc 362. During the rebound stroke of the damper 110, as the piston assembly 208 travels in the direction "D2", the fluid flows from the reserve chamber 234 into the rebound passage 344 through the rebound inlet 350. Due to the rebound stroke, a pressure of fluid within the rebound passage 344 may increase above a threshold bending load of the rebound bending disc 362. As such, the rebound bending disc 362 and/or the additional bending discs 364 may bend in the direction "D4". Accordingly, the rebound outlet 352 may open in order to allow flow of fluid from the rebound passage 344 into the lower working chamber 212.

The threshold bending load of the rebound bending disc 362 may be tuned in multiple ways. In one embodiment, parameters of the rebound fulcrum disc 358 may be adjusted in order to vary the threshold bending load of the rebound bending disc 362. For example, in one situation, the diameter "RD1" of the rebound fulcrum disc 358 may be relatively increased in order to provide a relatively higher bending diameter of the rebound bending disc 362 and a relatively higher threshold bending load of the rebound bending disc 362. In another situation, the diameter "RD1" of the rebound fulcrum disc 358 may be relatively decreased in order to provide a relatively lower bending diameter of the rebound bending disc 362 and a relatively lower threshold bending load of the rebound bending disc 362.

In another embodiment, parameters of the rebound preload disc 360 may be adjusted in order to vary the threshold bending load of the rebound bending disc 362. For example, in one situation, the thickness "RT2" of the rebound preload disc 360 may be relatively increased in order to provide a relatively higher preload on the rebound bending disc 362 and a relatively higher threshold bending load of the rebound bending disc 362. In another situation, the thickness "RT2" of the rebound preload disc 360 may be relatively decreased in order to provide a relatively lower preload on the rebound bending disc 362 and a relatively lower threshold bending load of the rebound bending disc 362. In another situation, the number of the rebound preload discs 360 may be increased in order to provide a relatively higher preload on the rebound bending disc 362 and a relatively higher threshold bending load of the rebound bending disc 362. In yet another situation, the number of the rebound preload discs 360 may be decreased in order to provide a relatively lower preload on the rebound bending disc 362 and a relatively lower threshold bending load of the rebound bending disc 362.

In another embodiment, parameters of the rebound bending disc 362 may be adjusted in order to vary the threshold bending load of the rebound bending disc 362. For example, in one situation, the thickness "RT3" of the rebound bending disc 362 may be relatively increased in order to provide a relatively higher threshold bending load of the rebound bending disc 362. In another situation, the thickness "RT3" of the rebound bending disc 362 may be relatively decreased in order to provide a relatively lower threshold bending load of the rebound bending disc 362.

In yet another embodiment, parameters of the additional bending discs 364 may be adjusted in order to vary the threshold bending load of the rebound bending disc 362. For example, the thickness "RT4" of the one or more additional bending discs 364 may be relatively increased in order to provide a relatively higher threshold bending load of the rebound bending disc 362. In another situation, the thickness "RT4" of the one or more additional bending discs 364 may be relatively decreased in order to provide a relatively lower threshold bending load of the rebound bending disc 362. In another situation, the number of the additional bending discs 364 may be increased in order to provide a relatively higher threshold bending load of the rebound bending disc 362. In yet another situation, the number of the additional bending discs 364 may be decreased in order to provide a relatively lower threshold bending load of the rebound bending disc 362.

The assembly 236 provides a simple, effective, and cost-efficient method to provide independent tuning of the damping characteristics of the rebound stroke relative to the damping characteristics of the compression stroke of the base valve assembly 236. More specifically, parameters of each of the rebound fulcrum disc 358, the rebound preload disc 360, the rebound bending disc 362, and the additional bending discs 364 may be varied in order to tune the damping characteristics of the assembly 236 for the rebound stroke independently of that of the compression stroke for a desired soft or firm setup of the damper 110. Also, the damping characteristics of the rebound stroke of the damper 110 may be tuned independently of a rod to bore ratio of the piston rod 226 and the pressure tube 202. Accordingly, the assembly 236 provides independent comfort tuning for semi-active dampers, such as the damper 110 employing the electronic valve 246.

For example, the rebound disc assembly 356 of the assembly 236 may provide independent tuning of soft damping characteristics of the damper 110 for the rebound stroke. The piston assembly 208 may provide independent tuning of soft damping characteristics of the damper 110 in the compression stroke. Also, the piston assembly 208 may provide independent tuning of firm damping characteristics of the damper 110 in the rebound stroke. Further, the compression disc assembly 332 of the assembly 236 may provide independent tuning of firm damping characteristics of the damper 110 for the compression stroke. Additionally, the electronic valve 246 may provide tuning of soft damping characteristics of the damper 110 in both the compression stroke and the rebound stroke.

Also, the assembly 236 includes the rebound land 366 that engages radially with the rebound bending disc 362. As such, the rebound land 366 provides a gradual and smooth opening of the rebound outlet 352 during bending of the rebound bending disc 362 and/or the additional bending discs 364, in turn, providing improved tuning of the damping characteristics of the rebound stroke of the assembly 236. Additionally, the assembly 236 may provide an improved and direct response of the damper 110 relative to a stroke input, in turn, providing improved performance. In some cases, the assembly 236 may also enable usage of a simple on/off valve as an alternative to the electronic valve 246, in turn, reducing system complexity and costs.

Further, the clamped and press-fitted configuration of the body 312, the compression disc assembly 332, and the rebound disc assembly 356 between the head 308 and the nut 310 of the elongate member 302 provides a substantially reduced operational noise compared to a conventional valve assembly having spring biased valving elements. The assembly 236 may be retrofitted in any damper with little or no modification to existing system, in turn, providing improved usability, flexibility, and compatibility. Also, the assembly 236 includes simple and readily available components, such as the elongate member 302, components of each of the compression disc assembly 332 and the rebound disc assembly 356, and so on, in turn, reducing complexity and costs.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A damper comprising:
    a pressure tube forming a working chamber;
    a piston assembly disposed within the working chamber, the piston assembly dividing the working chamber into an upper working chamber and a lower working chamber;
    a piston rod attached to the piston assembly;
    a reserve tube disposed around the pressure tube and defining a reserve chamber between the pressure tube and the reserve tube; and
    a base valve assembly fluidly disposed between the lower working chamber and the reserve chamber, the base valve assembly comprising:
        a valve body defining at least one compression passage and at least one rebound passage, the valve body comprising a lower valve body defining a first end face of the valve body and an upper valve body defining a second end face of the valve body;
        wherein the upper valve body includes at least one compression passage inlet and at least one rebound passage outlet, and wherein the lower valve body includes at least one compression passage outlet and at least one rebound passage inlet;
        wherein the at least one rebound passage inlet is orientated at approximately 180 degrees to the at least one rebound passage outlet;
        a compression disc assembly engaging the first end face of the valve body to restrict flow through the at least one compression passage; and
        a rebound disc assembly engaging the second end face of the valve body to restrict flow through the at least one rebound passage, the rebound disc assembly including at least one rebound bending disc that directly engages the second end face to close the at least one rebound passage,
        wherein the rebound bending disc bends in response to pressure within the at least one rebound passage to permit flow through the at least one rebound passage.

2. The damper of claim 1 further comprising:
    an intermediate tube disposed between the pressure tube and the reserve tube, wherein an intermediate chamber is defined between the intermediate tube and the pressure tube; and
    an electronic valve fluidly coupled to the intermediate chamber and the reserve chamber, the electronic valve adapted to control fluid flow between the intermediate chamber and the reserve chamber.

3. The damper of claim 1, wherein the rebound disc assembly further comprises a rebound fulcrum disc and a rebound preload disc, and wherein the rebound bending disc is disposed between the rebound fulcrum disc and the rebound preload disc.

4. The damper of claim 1, wherein the at least one compression passage inlet is orientated at approximately 90 degrees to the at least one compression passage outlet.

5. A damper comprising:
- a pressure tube forming a working chamber;
- a piston assembly disposed within the working chamber, the piston assembly dividing the working chamber into an upper working chamber and a lower working chamber;
- a piston rod attached to the piston assembly;
- a reserve tube disposed around the pressure tube and defining a reserve chamber between the pressure tube and the reserve tube;
- an intermediate tube disposed between the pressure tube and the reserve tube, wherein an intermediate chamber is defined between the intermediate tube and the pressure tube;
- an electronic valve fluidly coupled to the intermediate chamber and the reserve chamber, the electronic valve adapted to control fluid flow between the intermediate chamber and the reserve chamber; and
- a base valve assembly fluidly disposed between the lower working chamber and the reserve chamber, the base valve assembly comprising:
  - a valve body defining at least one compression passage and at least one rebound passage, wherein the valve body comprises a lower valve body defining a first end face of the valve body and an upper valve body defining a second end face of the valve body;
  - a compression disc assembly engaging the first end face of the valve body to restrict flow through the at least one compression passage; and
  - a rebound disc assembly engaging the second end face of the valve body to restrict flow through the at least one rebound passage, the rebound disc assembly including at least one rebound bending disc that directly engages the second end face to close the at least one rebound passage,
  - wherein the rebound bending disc bends in response to pressure within the at least one rebound passage to permit flow through the at least one rebound passage.

6. The damper of claim 5, wherein the upper valve body includes at least one compression passage inlet and at least one rebound passage outlet; wherein the lower valve body includes at least one compression passage outlet and at least one rebound passage inlet.

7. The damper of claim 6, wherein the at least one compression passage inlet is orientated at approximately 90 degrees to the at least one compression passage outlet.

8. The damper of claim 6, wherein the at least one rebound passage inlet is orientated at approximately 180 degrees to the at least one rebound passage outlet.

9. The damper of claim 5 further comprising an elongate member disposed through each of the valve body, the compression disc assembly, and the rebound disc assembly.

10. The damper of claim 9 further comprising a nut threadably engaged with the elongate member adjacent to the second end face of the valve body, wherein the elongate member further includes a head disposed adjacent to the first end face of the valve body, and wherein the valve body, the compression disc assembly and the rebound disc assembly are clamped between the head and the nut.

11. The damper of claim 5, wherein the rebound disc assembly further comprises a rebound fulcrum disc and a rebound preload disc, and wherein the rebound bending disc is disposed between the rebound fulcrum disc and the rebound preload disc.

12. A damper comprising:
- a pressure tube forming a working chamber;
- a piston assembly disposed within the working chamber, the piston assembly dividing the working chamber into an upper working chamber and a lower working chamber;
- a piston rod attached to the piston assembly;
- a reserve tube disposed around the pressure tube and defining a reserve chamber between the pressure tube and the reserve tube; and
- a base valve assembly fluidly disposed between the lower working chamber and the reserve chamber, the base valve assembly comprising:
  - an elongate member having a first end and a second end opposite to the first end, the elongate member comprising a head at the first end;
  - a nut threadably engaged with the elongate member proximate the second end;
  - a valve body disposed around the elongate member and defining at least one compression passage and at least one rebound passage, wherein the valve body comprises a lower valve body defining a first end face of the valve body and an upper valve body defining a second end face of the valve body, wherein the upper valve body includes at least one compression passage inlet and at least one rebound passage outlet, and wherein the lower valve body includes at least one compression passage outlet and at least one rebound passage inlet;
  - a compression disc assembly disposed around the elongate member and engaging the first end face of the valve body to restrict flow through the at least one compression passage; and
  - a rebound disc assembly disposed around the elongate member and engaging the second end face of the valve body to restrict flow through the at least one rebound passage, the rebound disc assembly including at least one rebound bending disc that directly engages the second end face to close the at least one rebound passage,
  - wherein the rebound bending disc bends in response to pressure within the at least one rebound passage to permit flow through the at least one rebound passage, and
  - wherein the valve body, the compression disc assembly and the rebound disc assembly are clamped between the head and the nut; and
  - wherein the at least one compression passage inlet is oriented at approximately 90 degrees to the at least one compression passage outlet, and wherein the at least one rebound passage inlet is oriented at approximately 180 degrees to the at least one rebound passage outlet.

13. The damper of claim 12, wherein the rebound disc assembly further comprises a rebound fulcrum disc and a rebound preload disc, and wherein the rebound bending disc is disposed between the rebound fulcrum disc and the rebound preload disc.

* * * * *